(12) United States Patent
Nimura et al.

(10) Patent No.: US 8,228,535 B2
(45) Date of Patent: Jul. 24, 2012

(54) PRINT CONTROLLING APPARATUS, PRINT CONTROLLING METHOD, AND PRINTER CONTROLLING SYSTEM FOR DISPLAYING A USER INTERFACE WINDOW

(75) Inventors: Kazunobu Nimura, Tatsuno-machi (JP); Masaharu Iwatani, Hata-Machi (JP)

(73) Assignee: Seiko Epson Corporation, Tokyo (JP)

( * ) Notice: Subject to any disclaimer, the term of this patent is extended or adjusted under 35 U.S.C. 154(b) by 1041 days.

(21) Appl. No.: 12/077,784

(22) Filed: Mar. 20, 2008

(65) Prior Publication Data

US 2009/0009797 A1 Jan. 8, 2009

(30) Foreign Application Priority Data

Mar. 23, 2007 (JP) ................... 2007-077289
Dec. 5, 2007 (JP) ................... 2007-311969

(51) Int. Cl.
*G06F 3/12* (2006.01)
(52) U.S. Cl. .............. 358/1.15; 358/1.14; 358/1.13; 347/7; 347/6; 709/230; 709/201
(58) Field of Classification Search .............. 358/1.15, 358/1.14, 1.13; 347/7, 6; 709/230, 201
See application file for complete search history.

(56) References Cited

U.S. PATENT DOCUMENTS

| 2002/0054340 A1* | 5/2002 | Tokutomi et al. ........... 358/1.15 |
| 2002/0095508 A1* | 7/2002 | Okazawa .................... 709/230 |
| 2006/0161658 A1* | 7/2006 | Noguchi .................... 709/225 |
| 2006/0168005 A1 | 7/2006 | Kanbara et al. |
| 2007/0002355 A1* | 1/2007 | Kai ......................... 358/1.13 |

FOREIGN PATENT DOCUMENTS

| JP | 11-261798 A | 9/1999 |
| JP | 2002-123384 | 4/2002 |
| JP | 2002-229889 | 8/2002 |
| JP | 2003-058438 | 2/2003 |
| JP | 2003-288506 | 10/2003 |
| JP | 2004-268516 | 9/2004 |
| JP | 2005-018742 A | 1/2005 |
| JP | 2006-155534 A | 6/2006 |
| JP | 2006-212893 | 8/2006 |
| JP | 2007-011794 | 1/2007 |

* cited by examiner

*Primary Examiner* — Jacky X Zheng
(74) *Attorney, Agent, or Firm* — Nutter McClennen & Fish LLP; John J. Penny, Jr.; Christina M. Sperry

(57) ABSTRACT

The invention relates to a print controlling apparatus for controlling the operation of a printer. The print controlling apparatus according to an aspect of the invention includes: a setting information storing section that memorizes language type information and country area information that are set for the print controlling apparatus; a status acquiring section that acquires status information of the printer; an image acquiring section that transmits the language type information and the country area information to a server when it is necessary to display a status notification screen for notifying a user of the status of the printer on the basis of the acquired status information of the printer, and then acquires image data corresponding to the language type information and the country area information from the server; and a display controlling section that commands an image based on the image data to be displayed in the status notification screen.

7 Claims, 8 Drawing Sheets

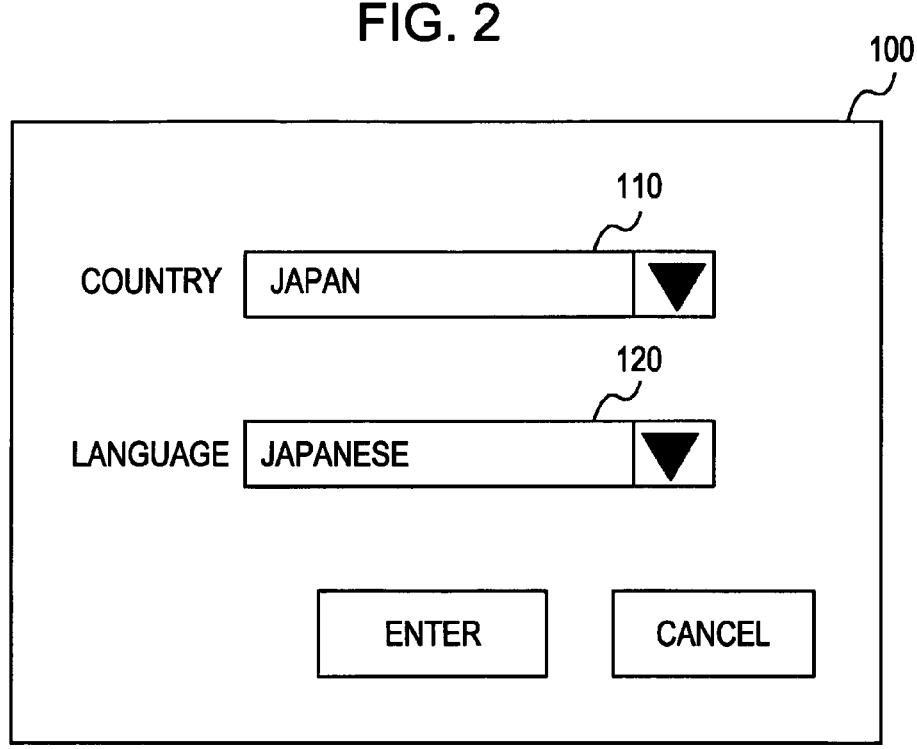

FIG. 8

CODE CONVERSION TABLE    302

| UNIFORM CODE | OS1 | OS2 | OS3 |
|---|---|---|---|
| UK | GB | 0xF2 | uk |
| FR | FRA | 0X54 | fr |
| ⋮ | ⋮ | ⋮ | ⋮ |

FIG. 9

REDIRECT TABLE    304

| UNIFORM CODE | HEAVY USER | REDIRECT DESTINATION ADDRESS URL |
|---|---|---|
| UK | ○ | http://www.abc.・・・ |
| UK | — | http://www.abc.・・・ |
| FR | ○ | http://www.def.・・・ |
| FR | — | http://www.def.・・・ |
| ⋮ | ⋮ | ⋮ |

PRINT CONTROLLING APPARATUS, PRINT CONTROLLING METHOD, AND PRINTER CONTROLLING SYSTEM FOR DISPLAYING A USER INTERFACE WINDOW

The entire disclosure of Japanese Patent Application Nos: 2007-077289, filed Mar. 23, 2007 and 2007-311969, filed Dec. 3, 2007 are expressly incorporated by reference herein.

BACKGROUND

1. Technical Field

The present invention generally relates to a technique that can be applied when having a print controlling apparatus perform print control for displaying a user interface window on a screen. In particular, the invention relates to a technique for acquiring an image that is to be displayed in the user interface window from a server in accordance with, for example, the setting of the print controlling apparatus.

2. Related Art

In recent years, the Internet shopping systems have been gaining increasing popularity. Through a service offered by such an online shopping system, a user can place an order for a variety of goods via a network for online purchase. One of a variety of the Internet shopping systems is a printer-related online purchase system that allows a user to purchase printer consumable supplies via the Internet transaction. Upon reception of an order from a user who visited the Internet shopping site and placed the order thereon, such an online shopping system performs a series of sales transaction processing related to the shipment of the ordered goods and the collection of money therefor on the basis of the received order.

In connection with such a service offered by an online shopping system, in the technical field to which the present invention pertains, a print controlling apparatus of the related art provides a user interface window on a display screen so as to notify a user that the remaining amount of their printer consumable supplies is small. In addition, the print controlling apparatus of the related art displays a link button in the user interface window with an aim to guide them to an online printer consumable shopping site. An example of such a technique is described in JP-A-2002-229889.

With the popularization of the Internet, these days, information distributed over networks is supplied beyond national borders. Accordingly, an online shopping site can receive orders not only from domestic customers but also from foreign customers.

From the viewpoint of customer-friendliness, it is preferable to tailor content that is presented to the Internet customers to local business practices that vary from one country or region to another. In order to offer such a locality-oriented online purchase service, it is necessary to diversify content that is presented to a user depending on their language or country (which includes regions and equivalents) (hereafter collectively and generally referred to as "country area") thereof if a universal online purchase infrastructure is adopted.

SUMMARY

An advantage of some aspects of the invention is to provide information that varies from one to another depending on user language or country area of a print controlling apparatus so as to present optimum information in a user interface screen presented by the print controlling apparatus.

In order to address the above-identified problem without any limitation thereto, the invention provides, as a first aspect thereof, a print controlling apparatus for controlling the operation of a printer, the print controlling apparatus including: a setting information storing section that memorizes language type information and country area information that are set for the print controlling apparatus; a status acquiring section that acquires status information of the printer; an image acquiring section that transmits the language type information and the country area information to a server when it is necessary to display a status notification screen for notifying a user of the status of the printer on the basis of the acquired status information of the printer, and then acquires image data corresponding to the language type information and the country area information from the server; and a display controlling section that commands an image based on the image data to be displayed in the status notification screen. In such a configuration, the above-described server is not necessarily configured as a single server. That is, the above-described server may be made up of a plurality of servers that function in cooperation with each other or one another. For example, the above-described server may be made up of, without any intention to limit the scope of the invention, three separate servers, that is, a user information acquisition server that receives user-specific information from the image acquiring section, an advertisement server that transmits advertisement data to the image acquiring section, and a printer consumable purchase transaction server that performs data transmission and data reception related to the purchase of printer consumable supplies. Or, alternatively, a single server may double as any two of these functional servers.

In the configuration of the print controlling apparatus according to the first aspect of the invention described above, it is preferable that the status notification screen should be a screen that notifies a user of the remaining amount of consumable supplies of the printer; and the server should be a server that receives a user request for purchasing new consumable supplies of the printer.

In the configuration of the print controlling apparatus according to the first aspect of the invention described above, it is preferable that the status notification screen should be a screen that notifies a user of the remaining amount of consumable supplies of the printer; and the image that is displayed in the status notification screen should be an advertisement image related to the sales of consumable supplies of the printer.

In the configuration of the print controlling apparatus according to the first aspect of the invention described above, it is preferable that the image acquiring section should transmit, in addition to the language type information and the country area information, the status information of the printer to a server; and the image data acquired from the server should be image data corresponding to the language type information, the country area information, and the printer status information.

In the print controlling apparatus having the preferred configuration described above, it is further preferable that the status information acquired from the printer should contain a first item related to the status of the printer and a second item related to the status of the printer; and a status indication according to the first item and an image corresponding to the status according to the second item should be displayed in the status notification screen.

It is preferable that the print controlling apparatus according to the first aspect of the invention described above should further include a cache memory that temporarily stores image data acquired by the image acquiring section, wherein, if the image acquiring section cannot acquire image data from the server, the display controlling section uses image data stored in the cache memory so as to display an image in the status notification screen.

In the print controlling apparatus having the preferred configuration described above, it is further preferable that, if the image acquiring section can acquire image data from the server during the display of an image based on image data stored in the cache memory in the status notification screen, the display controlling section should update display by replacing the image based on image data stored in the cache memory with an image based on newly acquired image data.

In the print controlling apparatus having the preferred configuration described above, it is further preferable that the status information acquired from the printer should contain information indicating the remaining amount of the consumable supplies of the printer.

In the print controlling apparatus having the preferred configuration described above, it is further preferable that the status information acquired from the printer should contain information indicating a predetermined replacement timing of the consumable supplies of the printer.

In the print controlling apparatus having the preferred configuration described above, the above-described predetermined replacement timing of the consumable supplies of the printer may be the replacement timing of an ink cartridge or the replacement timing of a toner cartridge. Or, the above-described predetermined replacement timing of the consumable supplies of the printer may be the replacement timing of a photosensitive drum. The unique configuration according to the first aspect of the invention described above as well as the preferred additions/modifications thereof described above may be implemented as, in addition to the print controlling apparatus described above, a computer program that is executed for the print controlling apparatus or a print controlling method.

In order to address the above-identified problem without any limitation thereto, the invention provides, as a second aspect thereof, a print controlling apparatus for controlling the operation of a printer, the print controlling apparatus including: a setting information storing section that memorizes language type information or country area information that is set for the print controlling apparatus; a status acquiring section that acquires status information of the printer; an image acquiring section that transmits a code indicating the language type information or the country area information to a server when it is necessary to display a status notification screen for notifying a user of the status of the printer, and then acquires image data corresponding to the language type information or the country area information from the server; an image judging section that judges whether the image data acquired by the image acquiring section is image data that corresponds to the status of the printer or not; and a display controlling section that commands an image based on the image data to be displayed in the status notification screen if it is judged by the image judging section that the image data acquired by the image acquiring section corresponds to the status of the printer, whereas the display controlling section commands a predetermined default image to be displayed in the status notification screen if it is judged by the image judging section that the image data acquired by the image acquiring section does not correspond to the status of the printer.

It is preferable that the print controlling apparatus according to the second aspect of the invention described above should further include a use-level judging section that acquires data indicating the consumption amount of consumable supplies that have already been used by the printer, and then makes a judgment as to the use level of the printer. In such a preferred configuration, the status notification screen should be a screen that notifies a user of the remaining amount of the consumable supplies of the printer; and the display controlling section should command an image corresponding to the use level of the printer judged by the use-level judging section to be displayed in the status notification screen.

In the print controlling apparatus having the preferred configuration described above, it is further preferable that the image acquiring section should transmit, in addition to the code indicating the language type information or the country area information, data indicating the use level that has been judged by the use-level judging section to the server, and then should acquire image data corresponding to the use level from the server.

In order to address the above-identified problem without any limitation thereto, the invention provides, as a third aspect thereof, a printer controlling system that has an integrated server and at least one print controlling apparatus that controls a printer, where the above-mentioned at least one print controlling apparatus is connected to the integrated server. The print controlling apparatus of the print controlling system includes: a setting information storing section that memorizes language type information or country area information that is set for the print controlling apparatus; a status acquiring section that acquires status information of the printer; a communicating section that transmits a code indicating the language type information or the country area information, which has a code system that is unique to the print controlling apparatus, to the integrated server, and then acquires image data corresponding to the language type information or the country area information; and a display controlling section that commands a status notification screen for notifying a user of the acquired status information of the printer to be displayed. The integrated server of the print controlling system includes: a code converting section that acquires the code indicating the language type information or the country area information, which has a code system that is dependent on the print controlling apparatus, from the print controlling apparatus, and then converts the acquired code into a uniform code indicating the language type information or the country area information; and a redirect processing section that performs redirection to an address corresponding to the uniform code indicating the language type information or the country area information that has been subjected to code conversion at the code converting section. In such a configuration of a printer controlling system according to the third aspect of the invention, the communicating section acquires the redirected address from the integrated server and then makes access to the acquired address so as to acquire image data corresponding to the language type information or the country area information; and the display controlling section commands an image based on the image data acquired by the communicating section to be displayed in the status notification screen.

BRIEF DESCRIPTION OF THE DRAWINGS

The invention will be described with reference to the accompanying drawings, wherein like numbers reference like elements.

FIG. 2 is a diagram that schematically illustrates an example of a setting screen (e.g., setting window) that is presented for the setting of country area and user language according to the first embodiment of the invention.

FIG. 3 is a diagram that illustrates an example of the data items of an advertisement data according to the first embodiment of the invention.

FIG. 8 is a diagram that illustrates an example of a code conversion table 302 according to the second embodiment of the invention.

FIG. 9 is a diagram that illustrates an example of a redirect table 304 according to the second embodiment of the invention.

DESCRIPTION OF EXEMPLARY EMBODIMENTS

With reference to the accompanying drawings, a network system according to a first embodiment of the invention is explained below.

Figure 1:
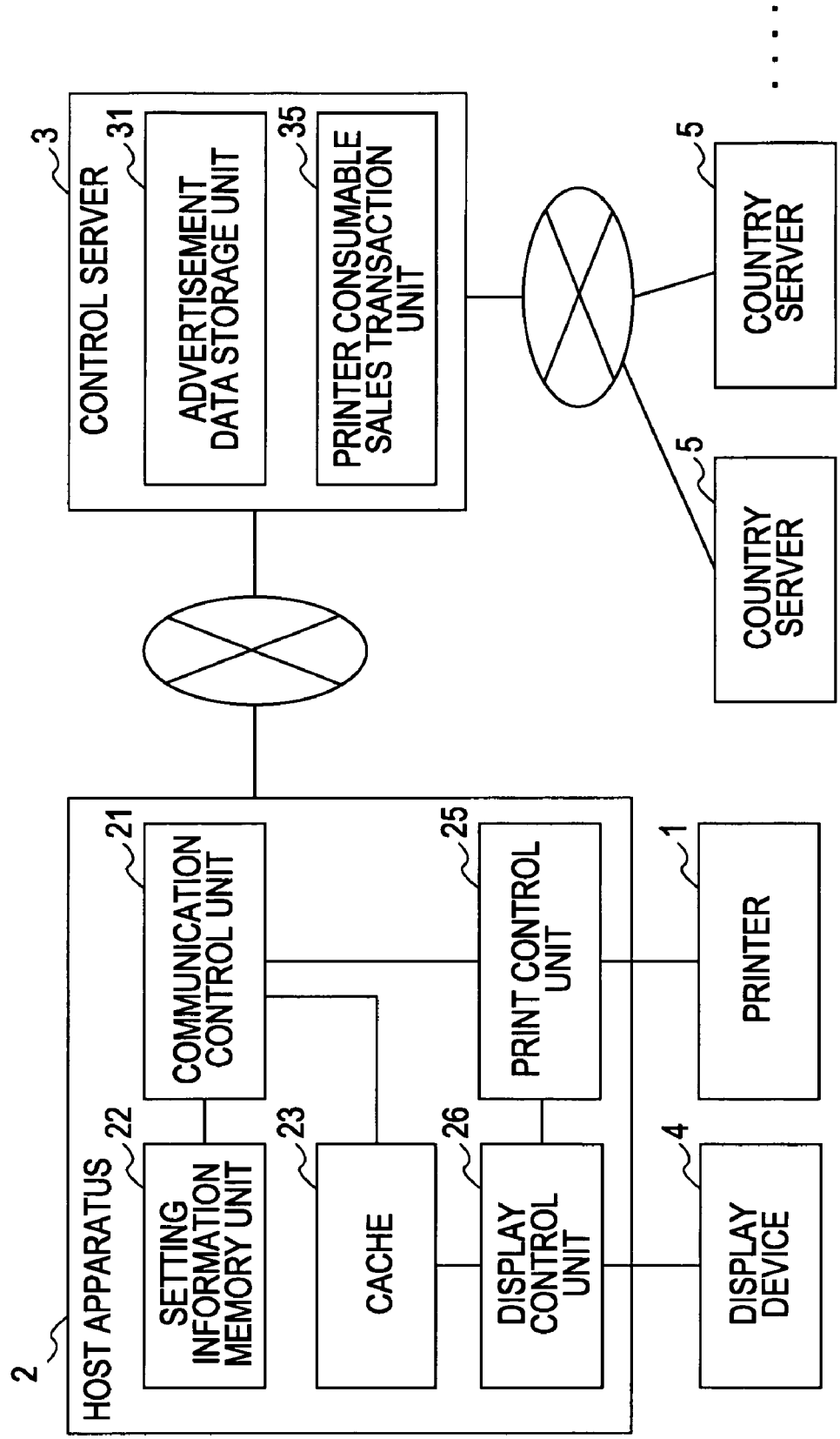
FIG. 1 is a diagram that schematically illustrates an example of the configuration of a network system according to a first embodiment of the invention.

FIG. 1 is a diagram that schematically illustrates an example of the configuration of a network system according to the first embodiment of the invention.

The network system according to the present embodiment of the invention is provided with a printer 1, a host apparatus 2 that functions as a controlling device of the printer 1, and a group of central servers that is connected to the host apparatus 2 via a network. The group of central servers includes but not limited to a control server 3 and a plurality of country servers 5, 5, . . . that are provided for respective country areas. The control server 3 is connected to the plurality of country servers 5, 5, . . . via another network. In the illustrated example of the configuration of the network system according to the present embodiment of the invention, only one host apparatus 2 is shown. Needless to say, however, the system may include more than one host apparatus 2.

Each of the host apparatus 2, the control server 3, and the plurality of country servers 5, 5, . . . is configured as a general-purpose computer system. Accordingly, the individual constituent elements and/or functions thereof of the host apparatus 2, the control server 3, and the plurality of country servers 5, 5, . . . that are described below are implemented as a result of, for example, the execution of computer programs.

The printer 1 may be configured as a variety of types of conventional printers. For example, without any intention to limit the scope of the invention, the printer 1 may be a laser printer, an ink-jet printer, or a thermal transfer printer.

The host apparatus 2 is connected to the printer 1 and a display device 4. As internal functional components thereof, the host apparatus 2 is provided with a communication control unit 21, a setting information memory unit 22, a cache memory (hereafter simply referred to as "cache") 23, a print control unit 25, and a display control unit 26.

The setting information memory unit 22 pre-stores the setting information of the host apparatus 2. The setting information includes, for example, information that indicates a country area in which the host apparatus 2 is used as well as information that indicates a language type used by the host apparatus 2.

FIG. 2 is a diagram that schematically illustrates an example of a setting screen (e.g., setting window) 100 that is presented for the setting of country area and user language according to an exemplary embodiment of the invention. The host apparatus 2 commands the display device 4 to display the setting screen 100. A user selects a specific country area in which the host apparatus 2 is located in a selection field (e.g., list box) 110 of the setting window 100. In addition, the user selects a specific language type that is used on the host apparatus 2 in a selection field 120 of the setting window 100. A country area code that indicates the selected country area that is inputted by the user on the setting screen 100 and a language type code that indicates the selected language type that is inputted by the user on the setting screen 100 are registered into the setting information memory unit 22.

As a non-limiting modification example thereof, the setting information memory unit 22 may further store the property information of the printer 1, which includes but not limited to the printer model name of the printer 1 and the printer ID number thereof.

The communication control unit 21 performs communication with the control server 3 via the network. For example, without any intention to limit the scope of the invention, the communication control unit 21 transmits, to the control server 3, the country area code, the language type code, and the model name of the printer 1, all of which are stored in the setting information memory unit 22. As a non-limiting modification example thereof, the communication control unit 21 may further transmit the status information of the printer 1 to the control server 3. The communication control unit 21 acquires advertisement data that corresponds to the specific information sent to the control server 3. The timing at which the communication control unit 21 sends the above-described set of information to the control server 3 may be, for example, at the time when the communication control unit 21 receives a sending instruction from the print control unit 25. The advertisement data that the communication control unit 21 has acquired is stored into the cache 23. The advertisement data that is stored into the cache 23 may be related to a plurality of advertisements.

In addition to the above-described communication, the communication control unit 21 transmits data to, and receives data from, the control server 3 for the purpose of purchasing printer consumable supplies. The control server 3 is not necessarily configured as a single server. That is, the control server 3 may be made up of a plurality of servers that function in cooperation with each other or one another. For example, the control server 3 may be made up of three separate servers, that is, a user information acquisition server that receives user-specific information from the communication control unit 21, an advertisement server that transmits advertisement data to the communication control unit 21, and a printer consumable purchase transaction server that performs data transmission and data reception related to the purchase of printer consumable supplies. Or, alternatively, a single server may double as any two of these functional servers. The control server 3 is made up of at least one server that embodies these functions. For example, the user information acquisition server that receives user-specific information from the communication control unit 21 makes an assignment to (e.g., assigns a user request to, where the target of assignment is not necessarily limited thereto) one appropriate country server 5 on the basis of the received information. Then, the assigned country server 5 transmits advertisement data held thereby on the basis of local language, local law, and local business practice that applies thereto for purchase transactions of printer consumable supplies.

The print control unit 25 controls the printer 1. Specifically, the print control unit 25 commands the printer 1 to execute a printing job. In addition, the print control unit 25 manages the status of the printer 1. As an example of a variety of functions thereof, the print control unit 25 acquires the status information of the printer 1 from the printer 1. The print control unit 25 can initiate the acquisition of the status information of the printer 1 in such a manner that the print control unit 25 requests the printer 1 to send the status information thereto. Or, alternatively, the printer 1 can notify the status thereof to the print control unit 25 at its own initiative, that is, without any request issued from the print control unit 25. For example, if the status of the printer 1 enters any predetermined error state or any predetermined alarm state, the printer 1 issues the status information thereof to the print control unit 25 at its own initiative.

Herein, the status information includes a plurality of status items. For example, the status information may include, without any limitation thereto, the following status items. A non-limiting example of the status items is: a variety of printer-consumable items such as the remaining amount of image formation media such as ink, toner, and the like, the number of times of the operations/uses of a photosensitive drum, and the total number of executions of printing jobs that have been carried out. Another non-limiting example of the status items is the remaining amount of battery.

Upon reception of the status information from the printer 1, the print control unit 25 acquires the status of the printer 1 on the basis of the received status information. Then, in order to notify the acquired status of the printer 1 to a user, the print control unit 25 sends an instruction to the display control unit 26 for the display of an interface screen that corresponds to the acquired status thereof.

In response to such an instruction issued from the print control unit 25, the display control unit 26 commands the display device 4 to display a predetermined interface screen. For example, the display control unit 26 commands the display device 4 to display a user interface window such as the setting screen 100 illustrated in FIG. 2 so as to allow a user to input setting information. As another example, the display control unit 26 commands the display device 4 to display a user interface window such as an ink-remaining-amount alarm screen 200 illustrated in FIG. 4 so as to notify the user of the status of the printer 1.

Figure 4:
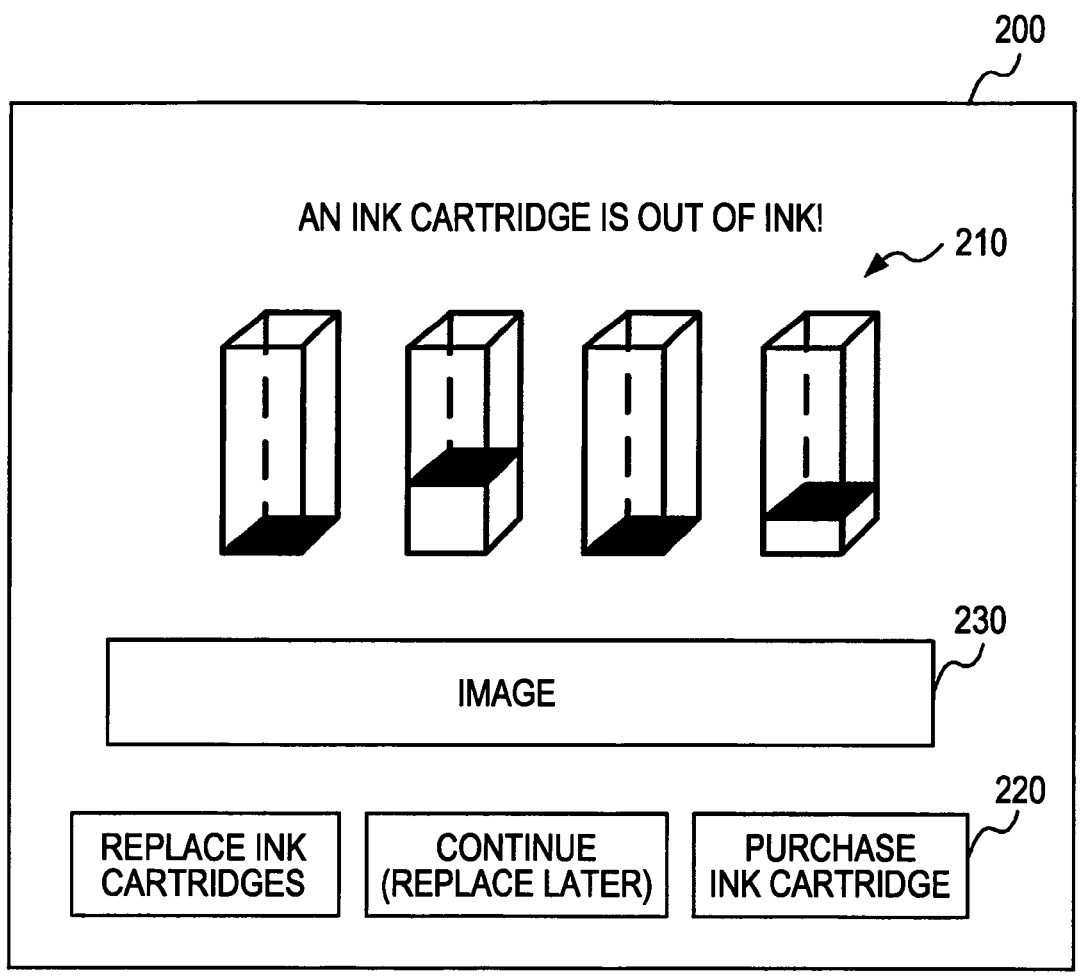
FIG. 4 is a diagram that schematically illustrates an example of an ink-remaining-amount alarm screen 200, which is displayed under an "ink-low" status, according to the first embodiment of the invention.

The ink-remaining-amount alarm screen 200 illustrated in FIG. 4 is a user interface window (i.e., user interface screen) that is displayed when any ink cartridge that is attached to the printer 1, which is assumed to be an ink-jet printer in this example, is running short of ink.

The control server 3 is provided with an advertisement data storage unit 31 and a printer consumable sales transaction unit 35.

The printer consumable sales transaction unit 35 of the control server 3 provides online printer consumable purchase opportunities to the host apparatus 2. For example, the printer consumable sales transaction unit 35 of the control server 3 supplies a predetermined user interface window such as, though not necessarily limited thereto, a printer consumable order sheet screen, to the host apparatus 2. By this means, the printer consumable sales transaction unit 35 receives an order from a customer-user on the basis of order information inputted thereby. Moreover, the printer consumable sales transaction unit 35 deals with the shipment of the ordered article on the basis of the order information inputted thereby.

The advertisement data storage unit 31 of the control server 3 pre-stores advertisement data 32, which is pre-stored to be sent to the host apparatus 2.

FIG. 3 is a diagram that illustrates an example of the data items of the advertisement data 32 that is memorized in the advertisement data storage unit 31 according to an exemplary embodiment of the invention. In the illustrated example, the advertisement data 32 includes the data items of an image data 321, a country area code 322, a language type code 323, a model name 324, an expiration date 325, and a (printer) status 326.

The image data 321 of the advertisement data 32 indicates, for example, the data of an image related to advertisement for the sales of printer consumable supplies.

The country area code 322 of the advertisement data 32 indicates, for example, a country area that corresponds to the image identified by the image data 321. The language type code 323 of the advertisement data 32 indicates, for example, a language type that corresponds to the image identified by the image data 321. The model name 324 of the advertisement data 32 indicates, for example, a printer model name that corresponds to the image identified by the image data 321. For example, if it is assumed that the image data 321 of the advertisement data 32 is the data of an image that is written in English, the language type code 323 thereof is set as "English". If it is assumed that the image data 321 of the advertisement data 32 is the data of an advertisement image related to a certain specific printer model, the model name of this printer is set in the model name 324 of the advertisement data 32.

The expiration date 325 of the advertisement data 32 indicates an expiration date that is set when having the host apparatus 2 present the display of the image identified by the image data 321. In particular, if there is any specified expiration date regarding the content of advertisement shown in the image, such a specified expiration date is set in the expiration date 325 of the advertisement data 32.

The status 326 of the advertisement data 32 indicates the status of the printer 1 that corresponds to the image of the image data 321. For example, the status 326 of the advertisement data 32 may be set for a plurality of status items.

The advertisement data that is stored in the advertisement data storage unit 31 may be registered from, for example, the country server 5. In other words, the country server 5 can create its original advertisement data 32 and then register the created original advertisement data 32 in the advertisement data storage unit 31.

For example, upon reception of user-specific information on a country area code, a language type code, and a printer model name from the host apparatus 2, some advertisement data 32 that have the country area code 322, the language type code 323, and the model name 324 agreeing with (i.e., matching) the received information is sent to the host apparatus 2. If the data notified from the host apparatus 2 further contains status information, the advertisement data 32 that further has the status 326 agreeing with that of the notified data is transmitted to the host apparatus 2. Herein, if the status 326 includes a plurality of items, the advertisement data 32 that has the status 326 that partially agrees with that of the notified data may be transmitted to the host apparatus 2.

It may be configured so that the advertisement data 32 that has the country area code 322, the language type code 323, the model name 324, and the status 326 all of which agree with the respective items of the notified information is limitedly sent to the host apparatus 2. Or, alternatively, it may be configured so that all of the advertisement data 32 that has the language type code 32 and the model name 324 which agree with the respective items of the notified information, regardless of the matching/mismatching of the country area code 322 and the status 326 therebetween, is sent to the host apparatus 2, which is a non-limiting example. That is, all of the advertisement data 32 that has the data items that at least partially agree with the respective items of the notified information may be sent to the host apparatus 2.

Moreover, the status information notified from the host apparatus 2 may include an item that indicates the use of the printer 1. For example, the status information may contain the property information of a JPEG image(s) that is outputted by the printer 1. The property information of a JPEG image includes an explanation of an object (i.e., photographic subject) that is photographed in the JPEG image. If it is found on the basis of the property information thereof that an animal companion is photographed in many of the JPEG images that have been printed by the printer 1, pet-related advertisement data 32 may be sent to such a user.

It should be noted that any advertisement data 32 that has an expired date (325) is not transmitted to the host apparatus 2.

Next, referring to FIG. 4, an explanation is given below of a user interface window that is displayed when any ink cartridge that is attached to the printer 1, which is assumed to be an ink-jet printer in this example, is running short of ink. FIG. 4 is a diagram that schematically illustrates an example of the ink-remaining-amount alarm screen 200, which is displayed under an "ink-low" status, that is, at the time when the amount of remaining ink contained in any ink cartridge of the printer 1 becomes smaller than a predetermined threshold level. As illustrated in the drawing, the ink-remaining-amount alarm screen 200 shows a set of "ink meters" 210 that indicates the remaining amount of ink for respective ink cartridges, an ink purchase button 220, and an image 230. Upon the detection of the ink-low status at the printer 1, status information that includes an item on the remaining amount of ink is sent to the print control unit 25 for user notification. Then, the display control unit 26 commands the display device 4 to display the ink-remaining-amount alarm screen 200.

The ink meter 210 indicates the remaining amount of ink on the basis of remaining-ink-amount information that is contained in the status information acquired from the printer 1.

When a user presses down the ink purchase button 220, the current user interface screen transitions to (i.e., links to) an ink purchase screen that is presented by the printer consumable sales transaction unit 35 of the control server 3. Then, the user can place an order for the purchase of ink from the host apparatus 2.

The image 230 is one that is based on the image data 321 of the advertisement data 32 that is acquired from the control server 3. The image 230 may contain a download link to the control server 3. It may be configured so that, for example, when a user clicks the image 230 related to a certain advertisement displayed thereat, the host apparatus 2 acquires a given image that is associated with the advertisement from the control server 3 so that the acquired image is displayed on the display screen of the display device 4.

As a non-limiting modification example thereof, the image 230 may be an advertisement screen that is determined on the basis of a status item that is not the remaining amount of ink. In other words, the image 230 that appears on the ink-remaining-amount alarm screen 200 may vary depending on another status item that is not the status item that is to be notified to the user. For example, if the total number of executions of printing jobs that have been carried out is very large and thus exceeds a predetermined threshold number of times thereof, the image 230 that is displayed thereat may be related to the advertisement of a new printer.

Figure 5:
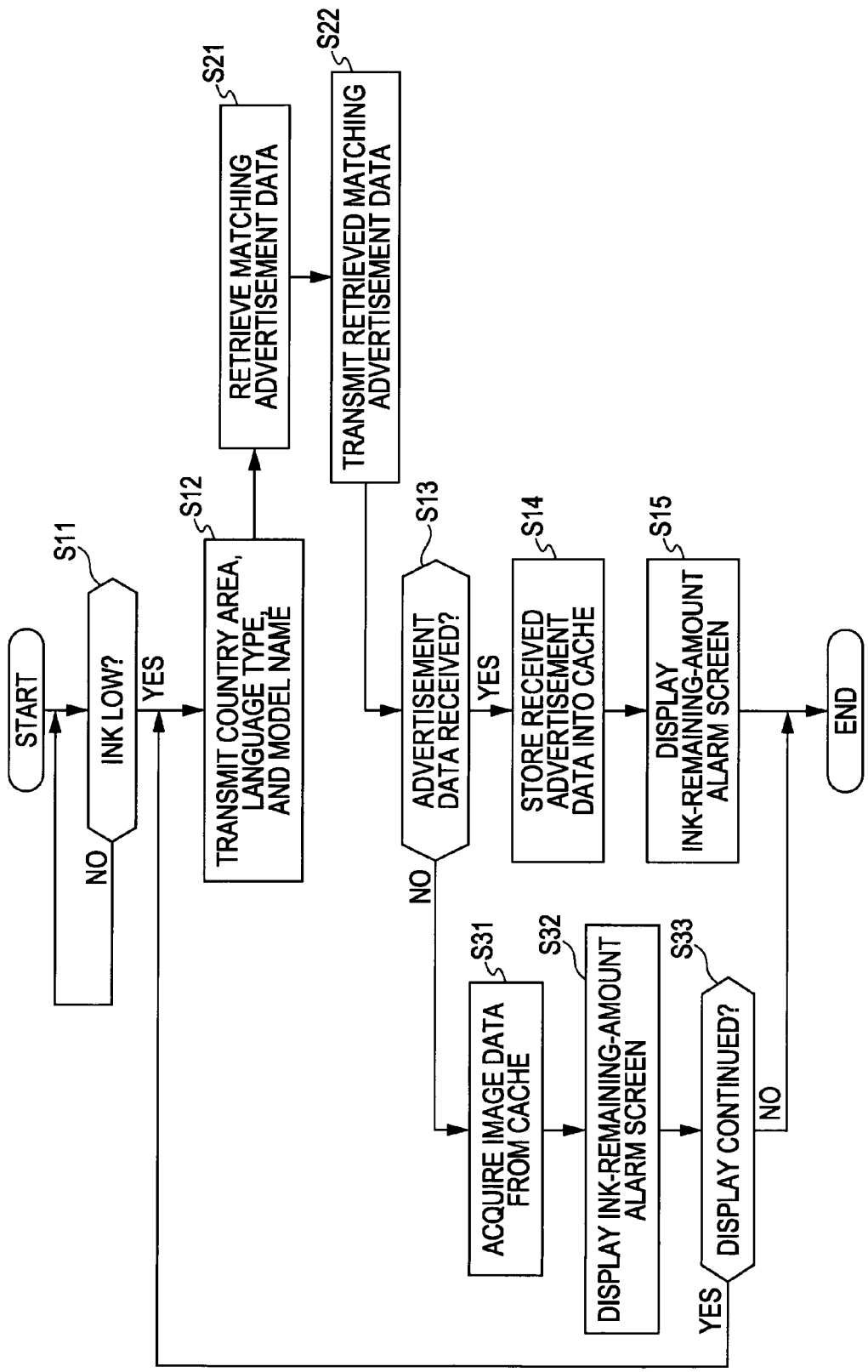
FIG. 5 is a flowchart that illustrates an example of the procedure as to how a network system according to the first embodiment of the invention provides a display of the ink-remaining-amount alarm screen 200.

Next, while referring to the flowchart illustrated in FIG. 5, the procedure as to how a network system according to the present embodiment of the invention provides a display of the ink-remaining-amount alarm screen 200 is explained below.

As a first step thereof, the print control unit 25 makes a judgment as to whether any of ink cartridges attached to the printer 1 is in the aforementioned ink-low state or not on the basis of the status information acquired from the printer 1 (step S11). If the print control unit 25 judges that any of ink cartridges attached to the printer 1 is in the aforementioned ink-low state (step S11: YES), the communication control unit 21 transmits the country area code, the language type code, and the model name of the printer 1, all of which are pre-stored in the setting information memory unit 22, to the control server 3 (step S12).

Upon reception of the information sent from the host apparatus 2, the control server 3 retrieves data that agree with the received information out of the advertisement data 32 that is memorized in the advertisement data storage unit 31 (step S21). Then, the control server 3 sends the retrieved "matching" data to the host apparatus 2 (step S22).

If the host apparatus 2 successfully receives advertisement data from the control server 3 (step S13: YES), the host apparatus 2 stores the received data into the cache 23 thereof (step S14). Thereafter, the display control unit 26 embeds (i.e., lays out) therein the image 230 that is based on the image data 321 of the advertisement data 32 that is acquired from the control server 3. Then, the display control unit 26 commands the display device 4 to display the ink-remaining-amount alarm screen 200 (step S15).

On the other hand, if the host apparatus 2 does not receive any advertisement data from the control server 3 (step S13: NO), the display control unit 26 acquires the image data 321 of the advertisement data 32 that is stored in the cache 23 (step S31). Thereafter, the display control unit 26 embeds therein the image 230 that is based on the image data 321 of the advertisement data 32 that is acquired from the cache 23. Then, the display control unit 26 commands the display device 4 to display the ink-remaining-amount alarm screen 200 (step S32). In such an acquisition of the image data 321 of the advertisement data 32, the display control unit 26 may check the expiration date 325 thereof so as to exclude any expired image data from the target of acquisition. Moreover, the display control unit 26 may retrieve the image data 321 of the advertisement data 32 that matches the current status of the printer 1 out of the cache 23.

With such a configuration, even when it is not possible to conduct network communications due to some reasons, it is possible for the display control unit 26 to embed (i.e., show) the image 230 in the ink-remaining-amount alarm screen 200 by means of the image data 321 of the advertisement data 32 that is acquired from the cache 23, and then command the display device 4 to display the ink-remaining-amount alarm screen 200. If there is no image data 321 of the advertisement data 32 that is retained in the cache 23, the display control unit 26 may command the display device 4 to display the ink-remaining-amount alarm screen 200 without showing the image 230.

During the continued display of the ink-remaining-amount alarm screen 200 (step S33), the process loops back to the step S12 so that the communication control unit 21 makes a periodical attempt to acquire advertisement data from the control server 3. If the host apparatus 2 successfully receives advertisement data from the control server 3 (step S13: YES), the host apparatus 2 stores the received data into the cache 23 thereof (step S14). Thereafter, the display control unit 26 embeds therein the image 230 that is based on the image data 321 of the advertisement data 32 that is acquired from the control server 3. Then, the display control unit 26 commands the display device 4 to display the ink-remaining-amount alarm screen 200 (step S15). In this way, the image 230 of the ink-remaining-amount alarm screen 200 is updated.

Next, with reference to the accompanying drawings, a network system according to a second embodiment of the invention is explained below. In the configuration/operation of a network system according to the present embodiment of the invention, a host apparatus acquires an HTML document from a country server by means of a URL (Uniform Resource Locator) redirected in accordance with a country area code or a language type code. In the following description of a network system according to the second embodiment of the invention, differences in the configuration/operation thereof from that of the network system according to the first embodiment of the invention described above are mainly explained. Therefore, in the following description of the network system according to the second embodiment of the invention, the same reference numerals are consistently used for the same components as those of the network system according to the first embodiment of the invention so as to omit, if appropriate, any redundant explanation or simplify explanation thereof.

Figure 6:
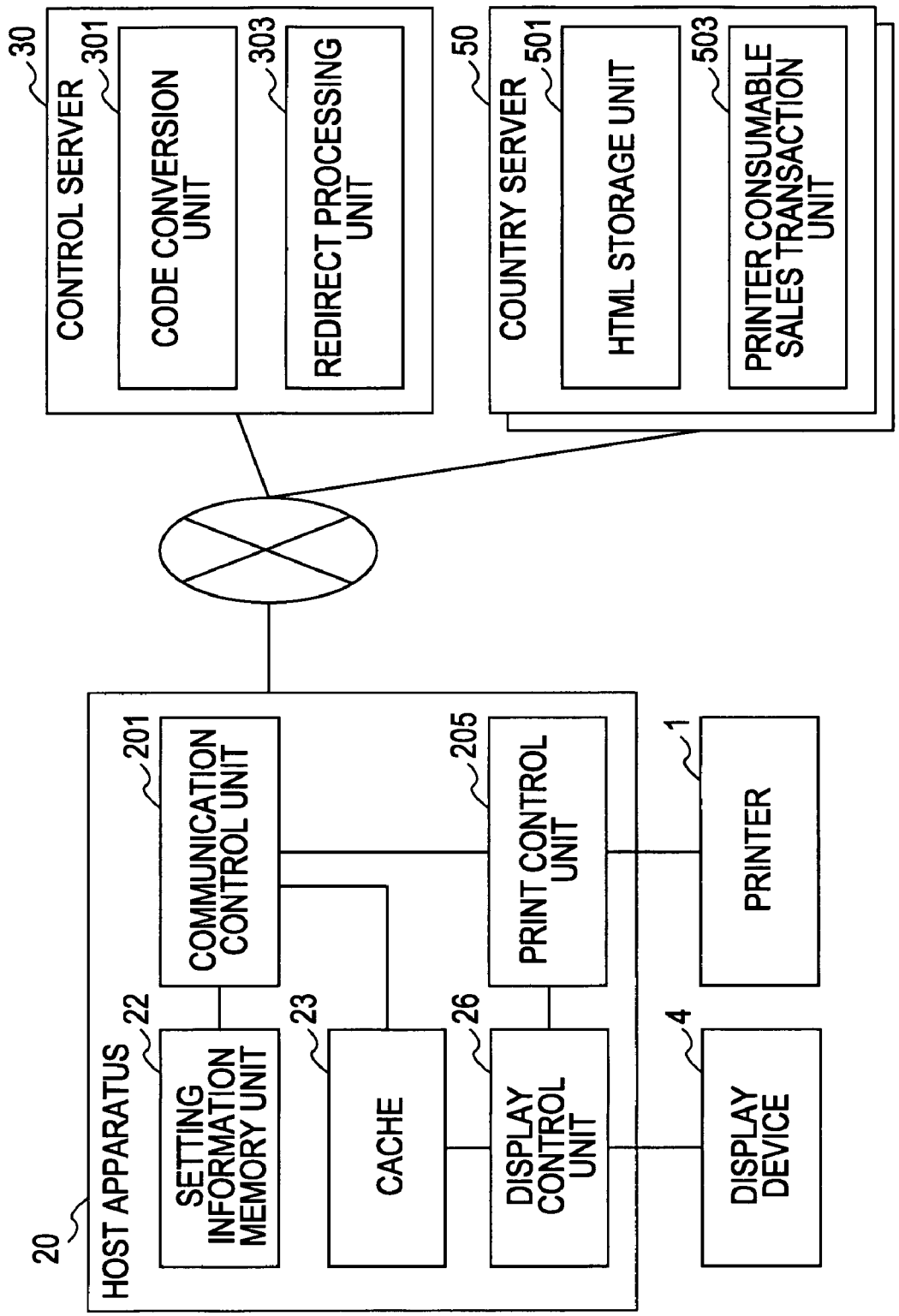
FIG. 6 is a diagram that schematically illustrates an example of the configuration of a network system according to a second embodiment of the invention.

FIG. 6 is a diagram that schematically illustrates an example of the configuration of a network system according to the second embodiment of the invention.

The network system according to the present embodiment of the invention is provided with the printer 1, a host apparatus 20 that functions as a controlling device of the printer 1, and a group of central servers that is connected to the host apparatus 20 via a network. The group of central servers includes but not limited to a control server 30 and a plurality of country servers 50, 50, . . . that are provided for respective country areas. The control server 30 is connected to the plurality of country servers 50, 50, . . . via the network. In the illustrated example of the configuration of the network system according to the present embodiment of the invention, only one host apparatus 20 is shown. Needless to say, however, the system may include more than one host apparatus 20.

Each of the host apparatus 20, the control server 30, and the plurality of country servers 50, 50, . . . is configured as a general-purpose computer system. Accordingly, the individual constituent elements and/or functions thereof of the host apparatus 20, the control server 30, and the plurality of country servers 50, 50, . . . that are described below are implemented as a result of, for example, the execution of computer programs.

As internal functional components thereof, the host apparatus 20 is provided with a communication control unit 201, the setting information memory unit 22, the cache (i.e., cache memory) 23, a print control unit 205, and the display control unit 26.

The communication control unit 201 performs communication with the control server 30 via the network. For example, without any intention to limit the scope of the invention, the communication control unit 201 transmits, to the control server 3, the country area code or the language type code that are stored in the setting information memory unit 22. As a non-limiting modification example thereof, the communication control unit 201 may further transmit data that indicates the use level of the printer 1 to the control server 30. Upon reception of a URL notification from the control server 30, the communication control unit 201 accesses the notified URL so as to acquire an HTML document. In addition to the above-described communication, the communication control unit 201 transmits data to, and receives data from, the control server 30 for the purpose of purchasing printer consumable supplies in the same manner as done by the communication control unit 21 according to the first embodiment of the invention described above.

The print control unit 205 controls the printer 1 in the same manner as done by the print control unit 25 according to the first embodiment of the invention described above. Specifically, the print control unit 205 commands the printer 1 to execute a printing job. In addition, the print control unit 205 manages the status of the printer 1. Moreover, in the same manner as done by the print control unit 25 according to the first embodiment of the invention described above, upon reception of the status information from the printer 1, the print control unit 205 acquires the status of the printer 1 on the basis of the received status information. Then, in order to notify the acquired status of the printer 1 to a user, the print control unit 205 sends an instruction to the display control unit 26 for the display of an interface screen that corresponds to the acquired status thereof.

In addition to the above-described functions, in the configuration/operation of the network system according to the present embodiment of the invention, the print control unit 205 makes a printer-use-level judgment on the basis of data that indicates the consumption amount of the consumable supplies of the printer 1. The print control unit 205 may make the printer-use-level judgment at the same point in time as it acquires printer status information from the printer 1 and then makes an ink-remaining-amount judgment thereon.

Figure 7:
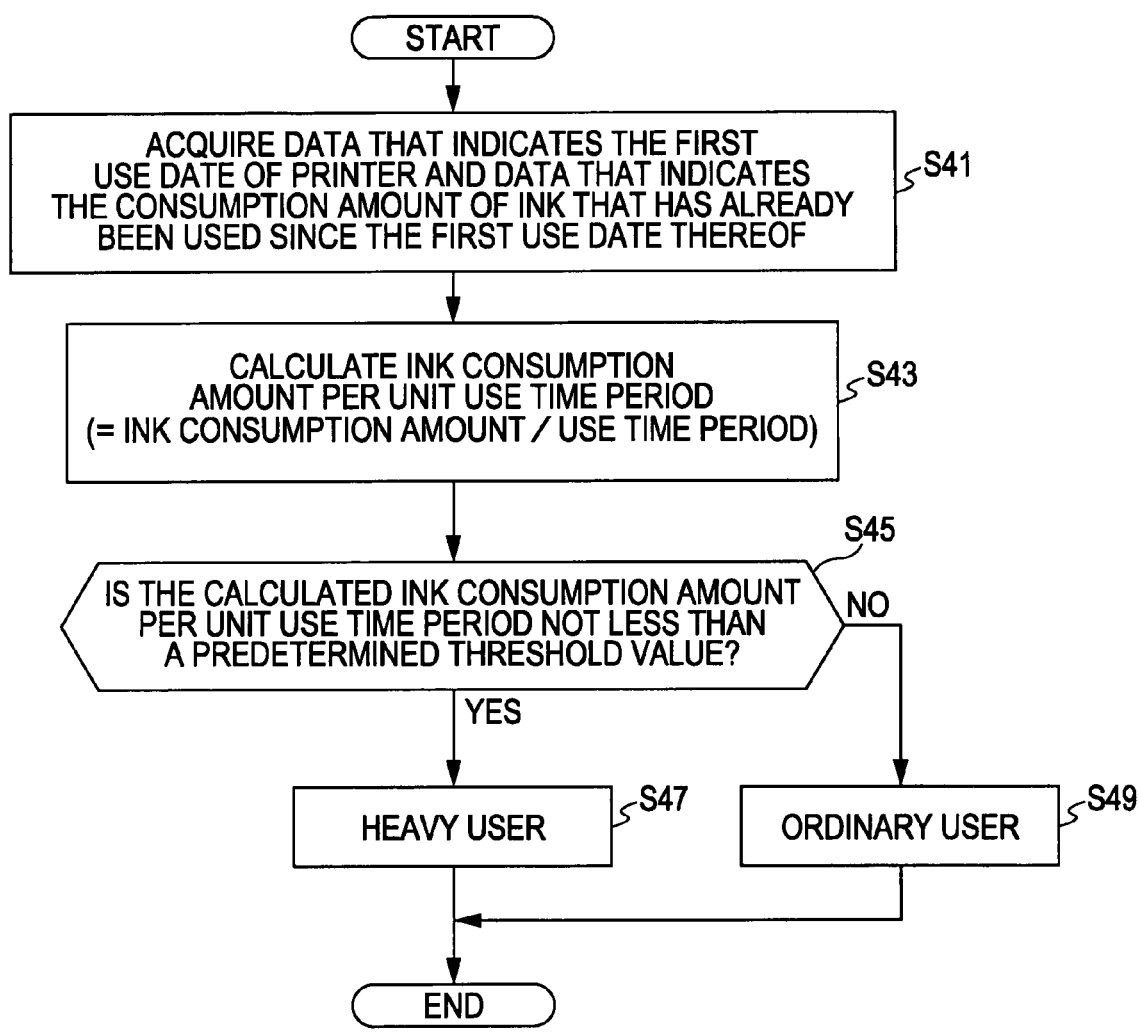
FIG. 7 is a flowchart that illustrates an example of the procedure of printer-use-level judgment according to the second embodiment of the invention.

For example, the print control unit 205 makes the printer-use-level judgment according to the procedure shown in FIG. 7. Through the printer-use-level judgment process, the print control unit 205 decides whether the user of the printer 1 is a heavy user who uses the printer 1 very frequently or an ordinary user who does not use the printer 1 so frequently. As a first step of the printer-use-level judgment procedure, the print control unit 205 acquires, from the printer 1, data that indicates the first use date thereof and data that indicates the (cumulative) consumption amount of ink that has already been used since the first use date thereof (step S41). Then, the print control unit 205 calculates ink consumption amount per unit use time period (which equals "ink consumption amount" divided by "use time period") on the basis of the acquired data (step S43). Depending on whether the calculated ink consumption amount per unit use time period is not less than a predetermined threshold value or not (i.e., less than the predetermined threshold value), the print control unit 205 makes a judgment in step S45 as to whether the user of the printer 1 is a heavy user who uses the printer 1 very frequently (denoted as S47) or an ordinary user who does not use the printer 1 so frequently (denoted as S49).

In an exemplary embodiment of the invention described above, a user is classified into either a heavy user or an ordinary user depending on the printer-use-level thereof. However, the invention should be in no case understood to be limited to such an exemplary configuration. For example, a user may be classified into three or more classes.

The control server 30 is provided with a code conversion unit 301 and a redirect processing unit 303.

The code conversion unit 301 of the control server 30 is responsible for the conversion processing of a country area code or a language type code that is sent from the host apparatus 20. As in the configuration of a network system according to the first embodiment of the invention described above, a country area code and a language type code are stored in the setting information memory unit 22 of each of the plurality of the host apparatuses 20. The code system (i.e., coding scheme) of the country area code and the code system of the language type code vary depending on the type of OS used in each of the plurality of the host apparatuses 20. In order to accommodate such a variation, the code conversion unit 301 of the control server 30 has a code conversion table 302 that is used when converting an OS-dependent code system into a uniform code system that is adopted in the network system according to the present embodiment of the invention.

FIG. 8 is a diagram that shows an example of a code conversion table 302 according to the present embodiment of the invention. The code conversion table 302 pre-stores a plurality of sets of country area codes and uniform codes in association with one another. In each combination thereof, a set of country area codes each of which is unique to the corresponding one of a plurality of OS types is associated with the corresponding uniform code. In the configuration/operation of a network system according to the present embodiment of the invention, the code conversion unit 301 of the control server 30 looks up the code conversion table 302 so as to convert a country area code that is contained in a request sent from the host apparatus 20 into the corresponding uniform code. In the code-conversion processing described above, it is explained that the code conversion unit 301 makes reference to the code conversion table 302 so as to convert a country area code contained in a user request sent from the host apparatus 20 into the corresponding uniform code. Notwithstanding the foregoing, the code conversion unit 301 may convert a language type code, in place of a country area code, into the corresponding (i.e., associated) uniform code. Or, as another non-limiting modification example thereof, the code conversion unit 301 may convert a combination of a country area code and a language type code into the corresponding uniform code.

Upon reception of an access request from the host apparatus 20, the redirect processing unit 303 of the control server 30 redirects the access request to a predetermined URL. For example, the redirect processing unit 303 has a redirect table 304 that is illustrated in FIG. 9. As illustrated therein, the redirect table 304 pre-designates a redirect destination address URL for each country area. As illustrated in the drawing, for each country area, one redirect destination address URL may be pre-designated for heavy users whereas another redirect destination address URL may be pre-designated for ordinary users. With such a configuration, since one redirect destination address URL is set for heavy users whereas another redirect destination address URL is set for ordinary users, it is possible to guide each user to a suitable redirect destination address URL depending on the use level of the printer 1 thereof. Each redirect destination address URL is the URL of the country server 50 of the corresponding country area. Each of the country servers 50, 50, . . . may register its own URL in the redirect table 304. The redirect processing unit 303 of the control server 30 makes reference to the redirect table 304 so as to identify/obtain a URL that corresponds to the uniform code that has been obtained as a result of code-conversion processing performed by the code conversion unit 301 thereof. Then, the redirect processing unit 303 returns the identified/obtained URL to the host apparatus 20.

Each of the country servers 50, 50, . . . is provided with an HTML storage unit 501 and a printer consumable sales transaction unit 503.

The HTML storage unit 501 pre-stores an HTML document that includes an advertising banner, though not limited thereto. The HTML document is designated as the redirect destination address URL of the redirect table 304. Therefore, the host apparatus 20 can acquire the HTML document by accessing the designated URL.

The configuration/operation/function of the printer consumable sales transaction unit 503 according to the present embodiment of the invention is the same as that of the printer consumable sales transaction unit 35 according to the first embodiment of the invention described above. That is, the printer consumable sales transaction unit 503 of the country server 50 provides online printer consumable purchase opportunities to the host apparatus 20.

Figure 10:
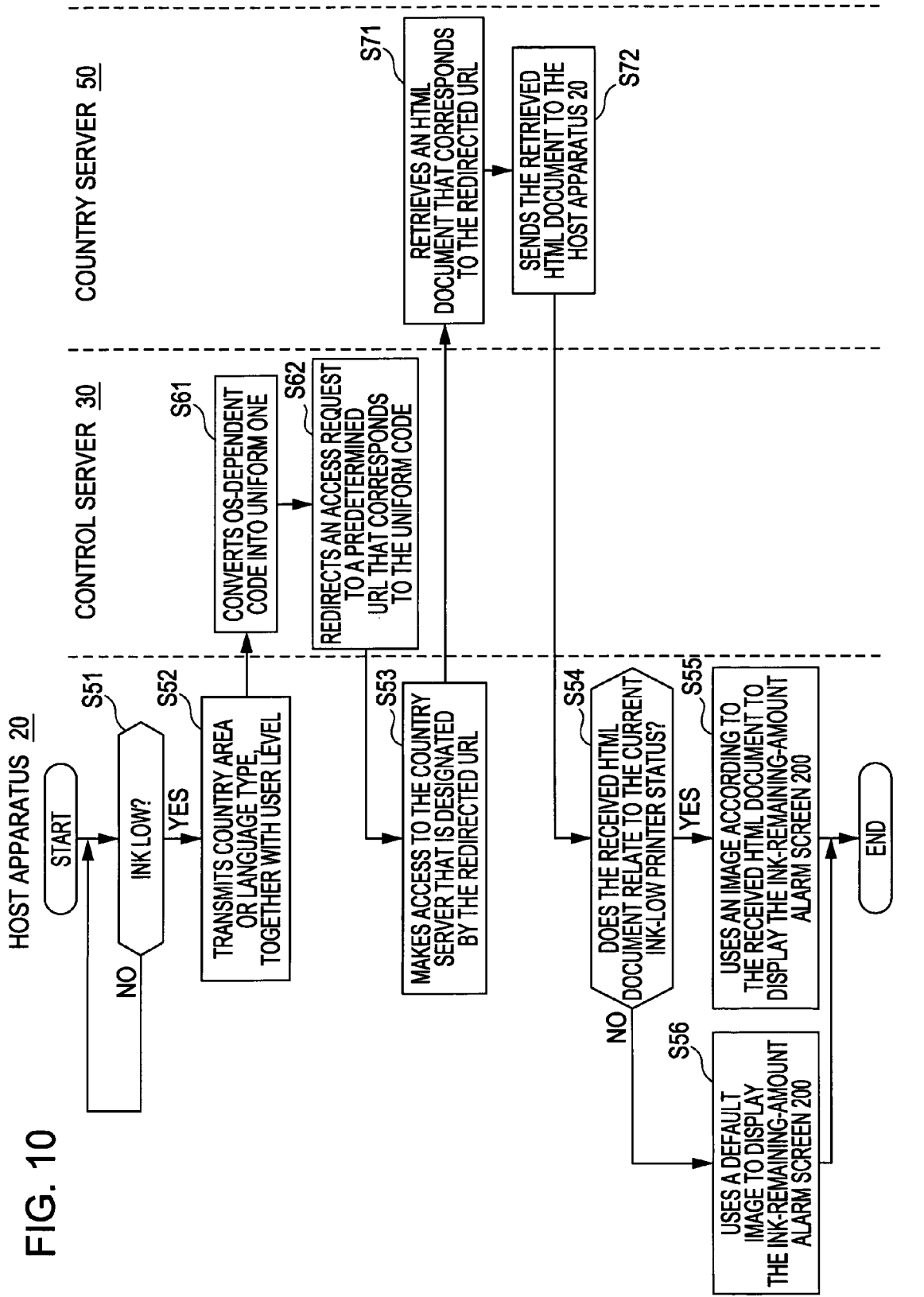
FIG. 10 is a flowchart that illustrates an example of the procedure as to how a network system according to the second embodiment of the invention provides a display of the ink-remaining-amount alarm screen 200.

Next, while referring to the flowchart illustrated in FIG. 10, the procedure as to how a network system according to the present embodiment of the invention provides a display of the ink-remaining-amount alarm screen 200 is explained below.

As a first step thereof, the print control unit 205 makes a judgment as to whether any of ink cartridges attached to the printer 1 is in the aforementioned ink-low state or not on the basis of the status information acquired from the printer 1 (step S51). If the print control unit 205 judges that any of ink cartridges attached to the printer 1 is in the aforementioned ink-low state (step S51: YES), the communication control unit 201 transmits the country area code or the language type code that are pre-stored in the setting information memory unit 22 to the control server 30 (step S52). In this step S52, the communication control unit 201 further transmits data that indicates whether the requesting user is a heavy user or an ordinary user to the control server 30.

The control server 30 receives information sent from the host apparatus 20. Then, the code conversion unit 301 of the control server 30 refers to the code conversion table 302 so as to convert, on the basis of the lookup result, the received country area code into the associated uniform code (step S61). Next, the redirect processing unit 303 of the control server 30 makes reference to the redirect table 304 so as to redirect the access request to a predetermined URL that corresponds to the uniform code that has been obtained as a result of code-conversion processing performed by the code conversion unit 301 thereof and further corresponds to the printer-use-level information that indicates whether the requesting user is a heavy user or an ordinary user. Then, the redirect processing unit 303 sends the redirected URL to the host apparatus 20 (step S62).

By this means, it is possible to redirect a user request to the URL of the appropriate country server 50 that corresponds to the country area in which the host apparatus 20 is located. Furthermore, it is possible to redirect a user request issued from any heavy user to the URL of the appropriate country server 50 that is not the same as the corresponding redirect destination address URL dedicatedly provided for ordinary users.

The host apparatus 20 acquires the redirected URL from the control server 30 and then makes access to the country server 50 that is designated by the redirected URL (step S53).

Upon reception of an access request from the host apparatus 20, the country server 50 retrieves an HTML document that corresponds to the redirected URL from the HTML storage unit 501 (step S71). Then, the country server 50 sends the retrieved HTML document to the host apparatus 20 (step S72). By this means, depending on the use level of the printer 1, it is possible to allow the host apparatus 20 to acquire images that vary from one to another.

Upon reception of the HTML document, the host apparatus 20 makes a judgment as to whether the received HTML document relates to the current status of the printer 1 or not. In the configuration of a network system (host apparatus 20) according to the present embodiment of the invention, the communication control unit 201 makes a judgment as to whether the received HTML document relates to the current status of the printer 1, which is the aforementioned ink-low state, or not (step S54). In this judgment process, the communication control unit 201 may check whether the tag of the header portion of the received HTML document is "<TITLE>Low Ink Reminder banner</TITLE>" or not so as to determine the relation therebetween, which is a non-limiting example of a judgment criterion.

If the communication control unit 201 judges that the received HTML document relates to the current ink-low state of the printer 1 (step S54: YES), the display control unit 26 embeds (i.e., lays out) therein an image according to the HTML document that is received from the control server 30. Then, the display control unit 26 commands the display device 4 to display the ink-remaining-amount alarm screen 200 (step S55). The received HTML document may be retained in the cache 23.

On the other hand, if the communication control unit 201 judges that the received HTML document does not relate to the current ink-low state of the printer 1 (step S54: NO), the display control unit 26 lays out therein a predetermined default image in place of an image according to the HTML document that is received from the control server 30. Then, the display control unit 26 commands the display device 4 to display the ink-remaining-amount alarm screen 200 (step S56). The default image that is displayed in the ink-remaining-amount alarm screen 200 that is presented to heavy users may not be the same as the default image displayed therein for presentation to ordinary users.

By this means, it is possible to avoid any unrelated image, that is, an image having no relation to content displayed in the ink-remaining-amount alarm screen 200, from being displayed thereon.

Although various exemplary embodiments of the present invention and some modification/variation examples thereof are described above with the accompanying illustrations, these exemplary embodiments and the modification/variation examples thereof are provided merely for the purpose of facilitating the understanding of the invention. Needless to say, these exemplary embodiments and modification/variation examples thereof are not intended to limit the scope of the invention. The invention may be modified, altered, changed, adapted, and/or improved within a range not departing from the gist and/or spirit of the invention apprehended by a person skilled in the art from explicit and implicit description made herein, where such a modification, an alteration, a change, an adaptation, and/or an improvement is also covered by the scope of the appended claims. It is the intention of the inventor/applicant that the scope of the invention covers any equivalents thereof without departing therefrom.

In the foregoing exemplary embodiments of the invention, the advertisement image 230 is shown in the ink-remaining-amount alarm screen 200. However, the invention is not limited to such a configuration. As a non-limiting variation example thereof, the screen (e.g., window) that shows the image 230 may be other screen that notifies status to a user. For example, it may be a progress-meter display screen that is displayed during the execution of printing. In such a case, the image may be shown either adjacent to a progress meter or in place of the progress meter.

Any function or configuration that is disclosed in either one of the first embodiment and the second embodiment of the invention may be applied to the other thereof if such an application is possible. For example, as may be done in the first embodiment of the invention, an image that is retained in the cache memory (23) may be used in place of an image having an expired date also in the second embodiment of the invention.

What is claimed is:

1. A print controlling apparatus for controlling the operation of a printer, the print controlling apparatus comprising:
    a setting information storing section that memorizes language type information or country area information that is set for the print controlling apparatus;
    a status acquiring section that acquires status information of the printer;
    an image acquiring section that transmits a code indicating the language type information or the country area information to a server when it is necessary to display a status notification screen for notifying a user of the status of the printer, and then acquires image data corresponding to the language type information or the country area information from the server;
    an image judging section that judges whether the image data acquired by the image acquiring section is image data that corresponds to the status of the printer or not; and
    a display controlling section that commands an image based on the image data to be displayed in the status notification screen if it is judged by the image judging section that the image data acquired by the image acquiring section corresponds to the status of the printer, whereas the display controlling section commands a predetermined default image to be displayed in the status notification screen if it is judged by the image judging section that the image data acquired by the image acquiring section does not correspond to the status of the printer;
    wherein the acquired image data is acquired as a part of advertisement data that also includes printer status data; and the image judging section judges whether the image data acquired by the image acquiring section is image data that corresponds to the status of the printer or not by comparing the acquired status information with the printer status data.

2. The print controlling apparatus according to claim 1, further comprising a use-level judging section that acquires data indicating the consumption amount of consumable supplies that have already been used by the printer, and then makes a judgment as to the use level of the printer, wherein the status notification screen is a screen that notifies a user of the remaining amount of the consumable supplies of the printer; and the display controlling section commands an image corresponding to the use level of the printer judged by the use-level judging section to be displayed in the status notification screen.

3. The print controlling apparatus according to claim 2, wherein the image acquiring section transmits, in addition to the code indicating the language type information or the country area information, data indicating the use level that has been judged by the use-level judging section to the server, and then acquires image data corresponding to the use level from the server.

4. The print controlling apparatus according to claim 1, wherein
    the acquired image data comprises a plurality of image data; and
    the image judging section determines whether any of the plurality of image data is image data that corresponds to the status of the printer or not; and the display controlling section commands the predetermined default image to be displayed in the status notification screen if it is judged by the image judging section that none of plurality of image data acquired by the image acquiring section corresponds to the status of the printer.

5. A print controlling method for controlling the operation of a primer, the prim controlling method comprising:

acquiring status information of the printer;

transmitting a code indicating language type information or country area information that is set for a print controlling apparatus that controls the operation of the printer to a server when it is necessary to display a status notification screen for notifying a user of the acquired status information of the printer;

acquiring image data corresponding to the code indicating the language type information or the country area information from the server;

judging whether the acquired image data is image data that corresponds to the status of the printer or not; and commanding an image based on the image data to be displayed in the status notification screen if it is judged that the acquired image data corresponds to the status of the primer, whereas commanding a predetermined default image to be displayed in the status notification screen if it is judged that the acquired image data does not correspond to the status of the printer;

wherein acquiring the image data comprises acquiring advertisement data that includes the image data and that includes printer status data; and judging whether the acquired image data is image data that corresponds to the status of the printer or not comprises judging whether the acquired image data is image data that corresponds to the status of the printer or not by comparing the acquired status information with the printer status data.

6. The print controlling method according to claim 5, wherein acquiring the image data comprises acquiring a plurality of image data; and judging whether the acquired image data is image data that corresponds to the status of the printer or not comprises determining whether any of the plurality of image data is image data that corresponds to the status of the printer or not; and the predetermined default image is commanded to be displayed in the status notification screen if it is judged that none of plurality of image data corresponds to the status of the printer.

7. A printer controlling system that has an integrated server and at least one print controlling apparatus that controls a printer, the above-mentioned at least one print controlling apparatus being connected to the integrated server, the print controlling apparatus of the print controlling system comprising:

a setting information storing section that memorizes language type information or country area information that is set for the print controlling apparatus;

a status acquiring section that acquires status information of the printer; a communicating section that transmits a code indicating the language type information or the country area information, which has a code system that is unique to the print controlling apparatus, to the integrated server, and then acquires image data corresponding to the language type information or the country area information;

an image judging section that judges whether the image data acquired by the image acquiring section is image data that corresponds to the status of the printer or not; and a display controlling section that commands a status notification screen for notifying a user of the acquired status information of the printer to be displayed;

wherein the acquired image data is acquired as a part of advertisement data that also includes printer status data; and the image judging section judges whether the image data acquired by the image acquiring section is image data that corresponds to the status of the printer or not by comparing the acquired status information with the printer status data;

the integrated server of the print controlling system comprising:

a code converting section that acquires the code indicating the language type information or the country area information, which has a code system that is dependent on the print controlling apparatus, from the print controlling apparatus, and then converts the acquired code into a uniform code indicating the language type information or the country area information; and a redirect processing section that performs redirection to a Uniform Resource Locator (URL) address corresponding to the uniform code indicating the language type information or the country area information that has been subjected to code conversion at the code converting section, wherein the communicating section acquires the redirected URL address from the integrated server and then makes access to the acquired URL address so as to acquire image data corresponding to the language type information or the country area information; and the display controlling section commands an image based on the image data acquired by the communicating section to be displayed in the status notification screen.

* * * * *